Jan. 22, 1935.  E. KARRER  1,988,597
APPARATUS FOR ASCERTAINING THE PLASTICITY OF MATERIALS
Filed Sept. 15, 1928  3 Sheets-Sheet 1
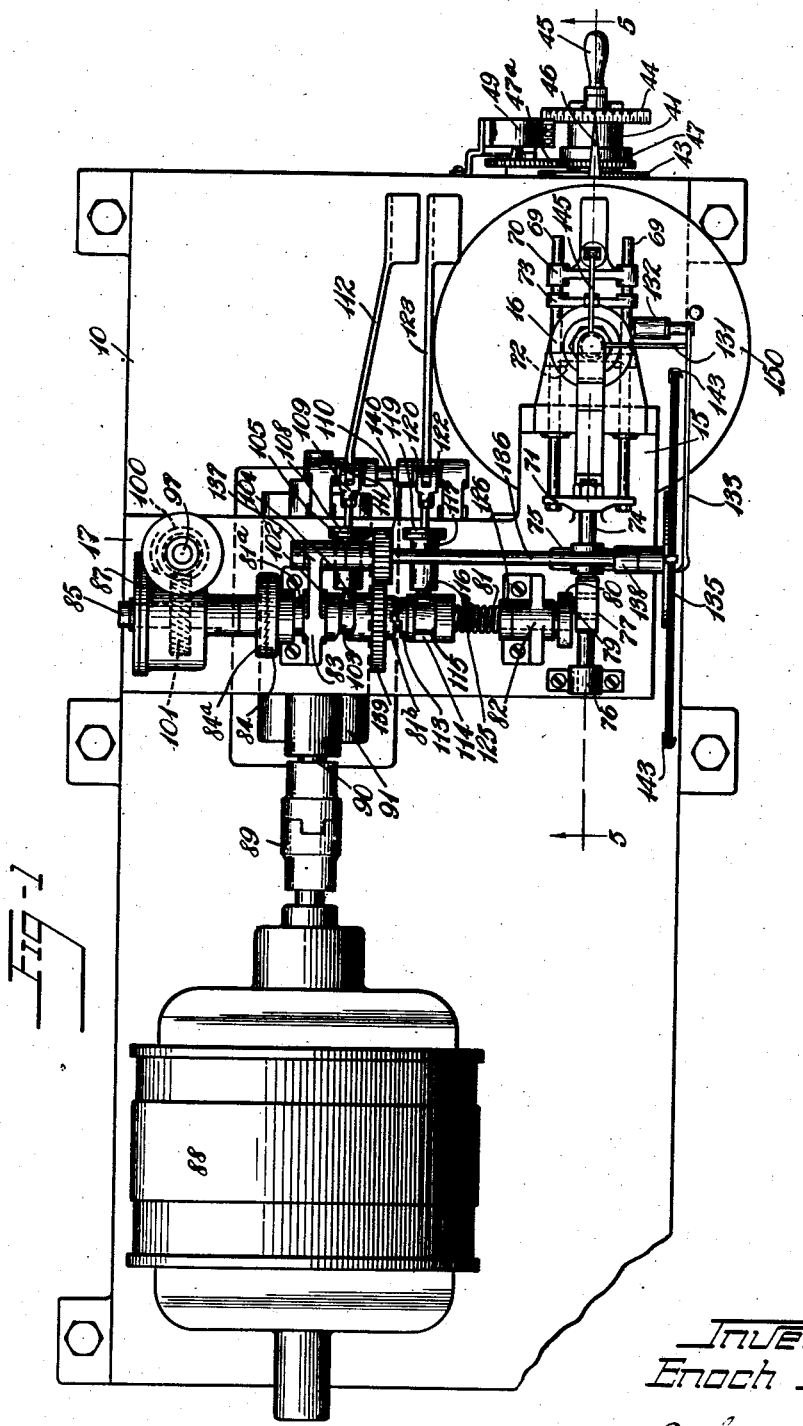
Inventor
Enoch Karrer
By Eakin & Avery
Attys.

Jan. 22, 1935.  E. KARRER  1,988,597
APPARATUS FOR ASCERTAINING THE PLASTICITY OF MATERIALS
Filed Sept. 15, 1928  3 Sheets-Sheet 2
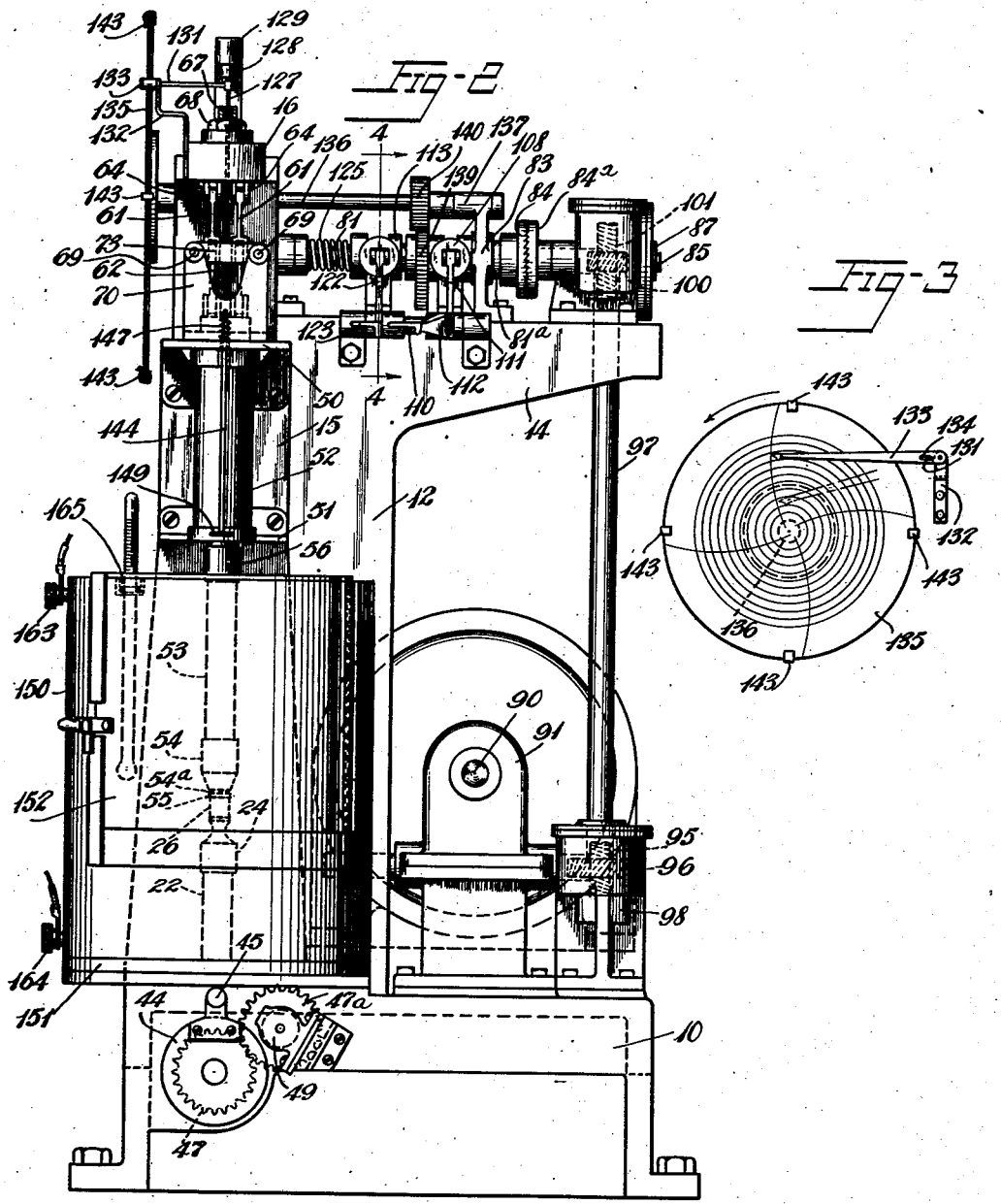
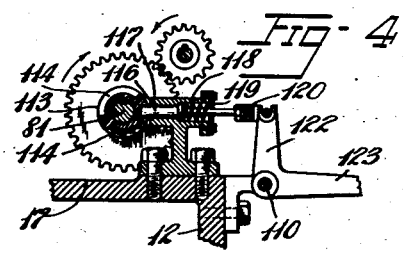
Inventor
Enoch Karrer
By Eakin & Avery
Attys.

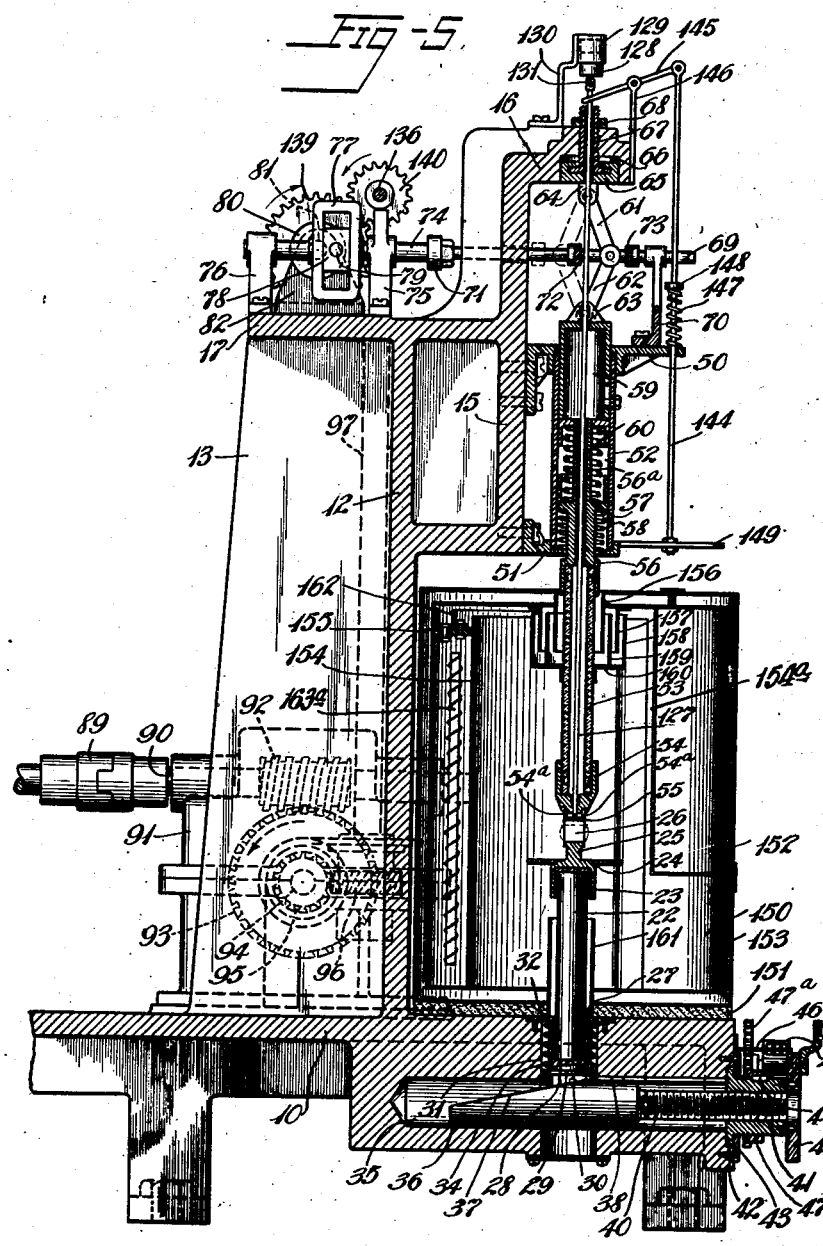

Patented Jan. 22, 1935

1,988,597

UNITED STATES PATENT OFFICE 1,988,597

APPARATUS FOR ASCERTAINING THE PLASTICITY OF MATERIALS

Enoch Karrer, Akron, Ohio, assignor to The B. F. Goodrich Company, New York, N. Y., a corporation of New York Application September 15, 1928, Serial No. 306,275

8 Claims. (Cl. 265—2)

This invention relates to apparatus for ascertaining the plasticity of substances, as in comparing the relative plasticities of test samples of unvulcanized rubber and the like.

My chief objects are to provide an improved apparatus whereby a better evaluation of the true plasticity of a substance, as distinguished from the characteristic of mere softness, may be obtained; to provide apparatus whereby the testing operation may be rapidly and economically performed upon successive test samples; and to provide for conveniently determining or ascertaining the several factors essential to evaluation of flow characteristics of a substance.

Plasticity is correctly defined as the susceptibility to and the retentivity of deformation and I find that with regard to the manufacture of rubber products, for example, where the unvulcanized rubber compositions are manipulated while possessing various degrees of plasticity, the retentivity of deformation, as well as softness or susceptibility to deformation, is an important factor.

However, the plastometers heretofore, commonly used ignore the retentivity factor and measure only the resistance to deformation of the substance being examined. A common method now extensively employed to determine the so-called plasticity of a substance is to measure the time rate of change in height of a piece of the substance having determinate value, under the influence of pressure exerted upon it by a determinate force of constant magnitude. This measures the softness of the substance under examination but does not evaluate the amount of permanent set or the amount of recovery occurring in the substance after removal of the deforming force. In the employment of the prior methods in determining the plasticities of such substances as rubber compositions and the like it has been found that the results obtained are often misleading and not true indices of the degrees of plasticity which such substances possess under the ordinary conditions of working of the rubber.

In order to secure plasticity values that may in the preferred practice of my invention I keep the time factor constant, while allowing the force to be variable within certain limits and allowing the deformation to be variable also within certain limits, maintaining other conditions constant.

In the accompanying drawings:

Fig. 1 is a plan view of apparatus embodying and adapted to carry out my invention in its preferred form.

Fig. 2 is a side elevation thereof.

Fig. 3 is a front elevation of the recording disc and associated parts.

Fig. 4 is a section on line 4—4 of Fig. 2.

Fig. 5 is a vertical section on the line 5—5 of Fig. 1, parts being omitted.

Referring to the drawings, my apparatus comprising a cast metal frame having a base portion 10 and an upright web portion 12 braced by a web 13 integral therewith (Fig. 5). The web 12 extends rearwardly a distance substantially half the width of the base portion 10, and near its upper end is formed with an arm 14 which extends rearwardly so as to overhang the remaining half of the base portion 10 and whose upper surface is continuous over the webs 12, 13 to provide a horizontal table 17.

A bracket structure 15 extends to the right (Figs. 1 and 5) from the upper, forward part of the web 12 and has an upper horizontal portion 16 projecting out over the base 10.

The mechanism for supporting a test piece of rubber or other material comprises a vertically-disposed and vertically-movable cylindrical tube 22 of porcelain, glass, or other material having a low coefficient of expansion and a low heat conductivity. The upper end of the tube 22 has a cap 23 secured thereto by means of cement or the like. Mounted on the cap 23 is a shouldered thimble or stage 24 having an upwardly-extending middle portion which forms an anvil or testpiece-seating portion 25, the latter having a smooth, horizontally-arranged upper surface. The said upper surface is of exactly the same shape and area as the circular surface of the test piece 26 to be seated thereupon. The lower end of tube 22 is grooved and extends into a sockcent the piston 128 whereby downward movement of the rod 144 raises the vertical rod 127.

A compression spring 147 surrounds a portion of the rod 144 and is interposed between the under surface of a collar 148 secured on the said rod, and the upper surface of the bracket 50 through which the rod 144 extends. A horizontal lever or latch member 149 is secured to the lower end of rod 144. The arrangement of the rod 144 and cooperating parts is such that by moving the rod 144 downward and thereafter projecting an end of latch 149 below the bracket 51, the lever member 145 presses upward upon the under surface of the transverse rod 131 and thereby raises the vertical rod 127 from the metal disc 55. A test piece may thereafter be readily mounted upon the anvil or supporting surface 25. After positioning the test piece the latch member 149 is removed from below the bracket 51, whereupon the spring 147 forces the rod 144 upwardly and the lever member 145 is actuated to release rod 131 and permit the rod 127 to move downward onto the disc 55.

For facilitating the testing of successive samples under identical conditions of temperature, I provide a container 150, preferably a vertically-arranged cylindrical structure, so positioned on the base 10 as to have its vertical axis in alignment with the vertical axes of the supporting member 22 and of the hollow push rod 53. An insulating member 151 of suitable material is positioned between the base 10 and the bottom of the container 150. This container 150 has a door 152 arranged in the cylindrical side and has means for latching the door. The container has an inner jacket 153 completely enclosed in the outer wall, the space between the two walls being adapted to be filled with heat-insulating material. A second inner wall 154 lies within the first-mentioned inner wall concentric with the latter and is spaced therefrom by the insulating spacing ring 155 to provide a housing for a container-heating device such as an electric resistance unit, the wall 154 terminating at the side of the door as shown at 154ª. A collar 162 is secured by a flange thereon to the upper surface of the insulating and spacing ring 155. The top of the container has a centrally-disposed aperture therein, which is defined by the depending cylindrical wall 156 which extends downwardly into the container a substantial distance. The top of the inner jacket 153 is cut away centrally thereof to permit the wall 156 to extend therethrough. A flanged cylindrical baffle member 157 is secured to the under part of the inner jacket 153 so as to be concentric with the wall 156.

Two concentric cylindrical members 158, 159, having a common base 160 are secured to the push rod 53 by clamping or other suitable means, the diameters of the respective cylindrical members being such that when moved upward into position along the rod 53 the upstanding edges of the member 158 is positioned outside of and adjacent the baffle member 157 and the corresponding edge of member 159 is positioned between the downwardly-extending cylindrical walls 156, 157 so as to constitute a baffle structure to prevent convection currents within the container 150.

A centrally-positioned aperture extends through both the bottom of the container and the jacket bottom thereof. A cylindrical tube 161 extends vertically upward through the aperture in the bottom and has its lower edge resting upon the flanged portion of bushing 32. The tube 161 serves to house a middle portion of the test-piece-supporting member 22, the tube and member 22 being out of contact with each other.

Heating elements such as electric resistance units 163ª or the like are suitably positioned between the inner wall of the jacket structure and the second inner wall 154, the respective terminals of the resistance coils being extended through the wall of the container and suitably mounted on binding posts 163, 164, as shown in Fig. 2.

By means of the insulated container 150 and heating elements therein, uniform temperatures within the container as high as 100° C. or higher can readily be maintained.

A thermometer well 165 is preferably provided in the top of the container 150 and is so positioned that the bulb of a thermometer will lie adjacent the test piece on the anvil surface.

Operation

The test piece of material, 26, is so cut or otherwise prepared as to have a determinate form, preferably that of a cylinder. In practice I use a cylindrical test piece 1 cm. long and 1 cm. in diameter.

Assuming the rod 144 to be held in its lower position by the latch 149 thereon having its end extending under the bracket 51, the rod 127 is supported in raised position. The cylindrical test piece 26 is mounted in upright position on the upper surface of the anvil 25. The circular metal disc 55 is then accurately positioned on the circular upper end of the test piece, and the rod 127 is moved downward by release of the latch 149, until the rod 127 extends below the bottom of the cap 54.

The test piece is then moved upward by turning the handle 45 until the disc on the top of the test piece contacts the rod 127 and moves it upward, the indicator rod 133 thus being moved on the surface of dial 135. When the disc 55 contacts the pins 54ª, at which time the indicator arrives at the zero position, the upward movement of the test-piece support is stopped. The calibration of the micrometer stage-raising-and-lowering device renders it possible to determine the variation in the height of the base of the test piece from the standard height by a reading of the said micrometer scale and the counting device after the indicator 133 has arrived at the said zero position on the disc 135. This vertical adjustment of the anvil 25 is necessary in order to start compression of the sample with zero force and with the index always at the same initial point.

A record disc or chart for use in recording the plasticity measurements is now secured to the outer face of the dial 135. The clutch members 84, 84ª, being out of engagement with each other, the synchronous motor 88 is started, the latter then driving the clutch member 84ª at a constant determinate speed through the coupling 89, reduction gear mechanism 91, shafts 94, 97 and 85, and the interassociated parts.

Both of the lever arms 112 and 123 are now pressed downwardly momentarily. This withdraws the pins 104 and 116 from contact with the respective cam groove 103 and the respective recess 114, whereupon the clutch member 113 mounted on the shaft 81 as well as the collar 102 and clutch member 84 mounted on the sleeve 81ª are moved along shaft 81 under the force of the compression spring 125, until the clutch members 84 and 84ª engage each other. Shaft 81 is thereby rotated through the clutch member 84, sleeve 81ª, collar 102 and clutch member 113, whereupon the rotating shaft 81 acts through the guide member 77, slidable rods 74 and 69, and the toggle members 61, 62, to move the toggles past center. The toggles in moving past center exert a downward pressure upon the slide 59, moving the latter to exert force upon the spring 60 to compress the latter, whereby force is transmitted through the plunger 56 and push rod 53 to the test piece upon the anvil 25. The said test piece is thereupon quickly compressed an amount which varies with its softness and with the amount of force that is applied to it. In the preferred embodiment of the invention the time during which the force is applied to the sample is one second, although considerably longer or shorter periods of time may be used, according to the characteristics of the test sample.

As the test piece is progressively compressed, the rod 127 resting upon the disc 55 follows the upper surface of the test piece downward under its own weight and that of the dash-pot piston 128, and the horizontal rod 131, moving with the vertical rod 127 on which it is mounted, actuates the indicator 133.

The aforesaid momentary downward pressure on the lever 112 also causes the plate 135 to rotate at a determinate speed, the plate being driven through the gears 139, 140. The stylus on the indicator 133 is thus moved on the paper mounted on the revolving plate 135 so as to record the path of such movement, from which it is possible to determine the amount of deformation occurring in the test piece and, since the force of the spring assembly at different compressions is known, the value of the deforming force at any instant in the period of its application.

As the toggles pass over center, pressure downward upon the slide 59 is suddenly released due to the toggle construction, and thereupon the spring 58 functions to raise the push rod 53, plunger 56, spring 60 and slide 59 to their original positions and to retract the push rod 53 out of contact with the disc 55 on the test piece 26. The lower end of rod 127 remains in contact with the disc 55, due to its weight and that of the piston 128.

The lever arms 112 and 123 having been permitted to return to their original positions after the momentary depression thereof, the pin 116 moves into one of the recesses in the clutch member 113. As the clutch member rotates with the shaft 81 the pin 116 engages the curved portion of an end of one of the recesses and force is developed to cause the clutch member 113 to slide longitudinally along the shaft 81 against the force of spring 125, until the jaw clutch members 81ᵇ and 113 are disengaged this occurring at a half revolution of the shaft 81, corresponding to a movement of the toggles through dead center in one direction. The pin 116 locks the shaft 81, together with the various members of the force-applying mechanism operatively associated therewith against further movement.

Release of the lever 112 after the aforesaid momentary depression thereof permits the spring in housing 105 to move the pin 104 into association with the rotating cam surface 103. At the end of one revolution of the sleeve 81ª and of the collar 102 mounted thereon, the pin 104 extending into association with the moving cam surface forces the collar 102 along with the sleeve 81ª in a direction to disengage the clutch member 84 mounted on the sleeve from the clutch member 84ª mounted on shaft 85, whereupon the rotation of the sleeve 81ª, the gears 139, 140, shaft 136 and plate 135 is stopped, the movement of the sleeve 81ª longitudinally of the shaft 81 again engaging the clutch member 113 with the clutch member 81ᵇ, whereupon collar 102, sleeve 81ª and shaft 81 are locked against rotary movement, by means of the pin 116 engaged in the recess 114.

If the sample is very plastic most of the deformation due to the action of the force applied thereon will be retained upon removal of the force after the toggles pass over the center, whereas if the sample has little plasticity and yet is very elastic, it will rebound and not retain the deformation that has been given to it by the action of the spring for a definite time.

Since at the time of this sudden release of the force, the rod 127 remains with its lower end in contact with the disc 55, recovery of the test piece will cause upward movement of the rod 127. The extent of the upward movement of the top of the test piece will thus be transmitted by the rods 127 and 131 and indicated on the rotating disc 135. Due to the relative speed of the shafts 81 and 136, and because the toggle members 61, 62 apply the deforming force only while moving up to and into their dead center position, which corresponds to one-quarter of a revolution of the shaft 81, the first half of the first revolution of the disc 135 records the deforming force and the resulting deformation of the test piece during the time the force is being applied, while the second half of that revolution and the whole of the second revolution of the disc 135 made while the test piece is free of the deforming force records the extent of the recovery of the test piece from the effect of the deforming force. Upon the completion of two revolutions of the disc 135, it is stopped, this occurring at the completion of one revolution of sleeve 81ª, due to the clutch member 84 being disengaged from the clutch member 84ª under the action of the cam pin 104 moving in the cam groove 103, and being brought into engagement with the locked collar 113 on shaft 81.

If it is desired to observe and record the rate and extent of recovery of the test piece from the deforming force over a longer period of time than is represented by one and one-half revolutions of the disc 135, the procedure is the same as that already described with the exception that as soon as both levers 112 and 123 have been pressed to disengage the pins 104 and 116 from the respective cam surface 103 and groove 114 to start the operation of the device, the lever 123 alone is released promptly. This causes a single application of the deforming force to the test piece. Continuing to hold down the lever 112 permits the motor to continue to cause rotation of the recording disc or plate 135 for the time desired. Rotation of the disc 135 may then be stopped by release of the lever 112.

The provision of the dash pot 129 prevents too sudden an upward movement of the rod 127 in the event of a very rapid initial recovery of a test piece upon removal of the deforming force therefrom.

The spring 58 always returns the plunger 56 and slide 59 to the same position at the end of each cycle of operation.

The slide 59 moves downward the same distance at each operation, and the plunger 56 and the rod 127 move downward together during the application of the force to a given test sample, and the difference between the distance through which the slide moves and that through which the plunger 56 and rod 127 move measures the extent of the compression of the spring and, since the force of the spring assembly at different compressions is known, establishes the force-time schedule. The force that has been exerted to accomplish the compression is obtained from the chart by subtracting the force-scale reading for the maximum deformation of the sample from the point on the said scale that is indicated when a test is made with no sample on the anvil so that the spring 60 meets no corresponding resistance.

While the embodiment of the invention which is here shown does not apply uniform force to the test piece or successive test pieces, it has the advantages of quick operation upon a succession of test pieces and of applying a higher force to a comparatively non-yielding sample than to a highly-yielding sample, so that samples of widely varying plasticities may be tested without readjustment of the machine. During the period of making the test, a constant temperature is preferably maintained upon the test piece on the stage or anvil 25 by means of the heated container 150 which encloses the test piece and whose baffle construction effectively prevents formation of convection currents therein.

The insulating member 151 serves to prevent transfer of heat to the base 10 adjacent the working parts such as would seriously affect the micrometer construction and destroy the accuracy of the micrometer measurements. The use of the synchronous motor and the power transmission mechanism associated therewith insures a uniform time factor in the operation of the deforming means and the recording means.

My invention may be modified within the scope of the appended claims.

I claim:

1. Apparatus for determining the plasticity of a substance, the said apparatus comprising means for applying a deforming force to a surface of a test sample of the substance and for then relieving the sample of such force, and for making certain the time during which such force is applied, means for making certain a quantitative value of the force so applied, and means for making certain a quantitative value of deformation of the sample produced by the force and existing after the sample is relieved of the force, the last said means including a member freely movable with relation to the force-applying means and actuated independently thereof by the recoil of the test sample.

2. Apparatus as defined in claim 1 in which the force-applying means includes a spring and means for effecting timed movement of one end of the spring to apply the force of the spring to a test sample of the substance and then completely to relieve the sample of the force of the spring.

3. Apparatus as defined in claim 1 in which the movement-following member maintains a constant relationship with the adjacent surface of the test sample both during movement of the latter under the action of the deforming force and thereafter, and the apparatus comprises a dial-member adapted to be rotated at a determinate speed and an indicator-member operatively associated with the said movement-following member and arranged for actuation thereby so as to be moved along the said surface of the dial-member.

4. Apparatus for determining the plasticity of a substance, the said apparatus comprising means for applying a deforming force to a surface of a test sample of the substance and for then relieving the sample of such force and for making certain the time during which such force is applied, means for making certain a quantitative value of the force so applied, and means for making certain a quantitative value of the amount of deformation of the sample produced by the force and for making certain a quantitative value of deformation of the sample produced by the force and existing after the sample is relieved of the force, the last said means including a member freely movable with relation to the force-applying means and actuated independently thereof by the recoil of the test sample.

5. Apparatus for determining the plasticity of a substance, the said apparatus comprising means for supporting a test sample of the substance and means for applying deforming force to the sample in a force-time schedule dependent upon the deformability of the sample and for thereafter relieving the sample from the force, and means comprising a member following the movement of the sample for determining the amount of deformation in the sample after removal of the force therefrom.

6. Apparatus for determining the plasticity of substances, the said apparatus comprising means for supporting test samples of different substances in succession, means for applying deforming force for equal periods of time to successive test samples on said supporting means and for thereafter relieving the samples of said force, means for making certain a quantitative value of force so applied to each sample, and means for making certain any changes of dimension of the respective samples resulting from the application of the force and any changes resulting from the relieving of the samples of the said force, the last said means comprising a sample-engaging member for transmitting the force from the said force-applying means to the sample, the force-applying means being adapted to be withdrawn from contact with the said member while the latter is actuated by the recoil of the test sample.

7. Apparatus for determining the plasticity of substances, the said apparatus comprising means for supporting test samples of different substances in succession, means for applying deforming force for equal periods of time to successive test samples on said supporting means and for relieving each sample of such force at the end of each such period of time, means for making certain a quantitative value of force so applied to each sample, and means for making certain as to each sample a quantitative value of deformation of the sample caused by the force and existing after the sample is relieved of the force, the last said means comprising a plate adapted to lie upon the sample and unattached with relation to but adapted to sustain the force of the force-applying means.

8. Apparatus for determining the plasticity of a substance, the said apparatus comprising a support for a test sample of the substance, means for applying a deforming force to the sample and for thereafter relieving the sample of such force, driving means therefor, and means comprising an element operated in timed relation with the driving means for indicating the duration and amount of the force application and for indicating the amount of deformation existing in the sample at a determinate time after the sample has been relieved of the deforming force.

ENOCH KARRER.

Jan. 22, 1935. G. H. KLEEMEYER 1,988,598
RACK
Filed May 6, 1933
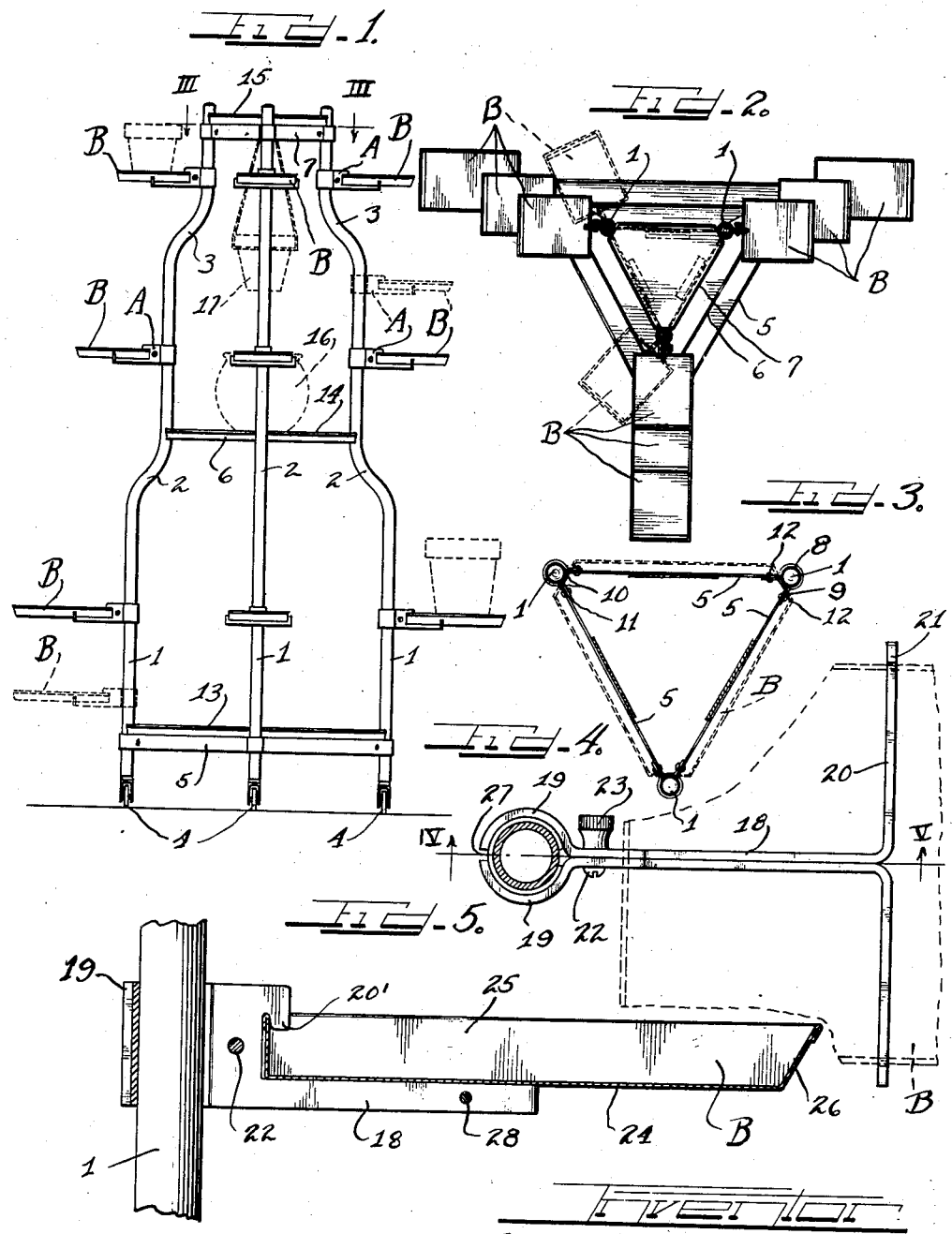
Inventor
Gertrude Harder Kleemeyer
by Charles H. Hills
Atty.